Figure 1:
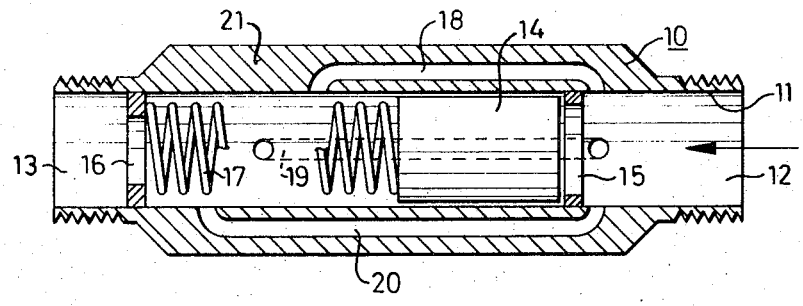

United States Patent [19]
Olsson

[11] 3,850,195
[45] Nov. 26, 1974

[54] FLUID PRESSURE VALVE
[76] Inventor: Eskil A. I. Olsson, Frustunavagen 43, 125 40 Alvsjo, Sweden
[22] Filed: Apr. 30, 1973
[21] Appl. No.: 355,642

[52] U.S. Cl. .................. 137/503, 137/493, 137/504, 137/516.11, 137/517, 137/606, 137/625.3, 137/625.37
[51] Int. Cl. ............................................ F16k 17/26
[58] Field of Search ...... 137/493, 503, 504, 516.11, 137/517, 538, 625.3, 625.37

[56] References Cited
UNITED STATES PATENTS

| | | | |
|---|---|---|---|
| 371,063 | 10/1887 | Hays | 137/503 |
| 922,578 | 5/1909 | Gries | 137/517 |
| 2,721,575 | 10/1955 | Gier et al. | 137/538 X |

*Primary Examiner*—Robert G. Nilson
*Attorney, Agent, or Firm*—Larson, Taylor and Hinds

[57] ABSTRACT

A fluid pressure valve for limiting the pressure drop in a fluid line. The valve housing has a bore therethrough from an inlet to an outlet with a piston axially movable in the bore. A biasing force acts on the piston in opposition to the flow direction. By-pass channels around the piston, preferably through the housing, are normally open in an initial position and then successively close to reduce the flow area as the pressure drop across the valve increases.

19 Claims, 6 Drawing Figures

FLUID PRESSURE VALVE

The present invention refers to fluid pressure valves and the invention is more particularly directed to a fluid pressure valve of the type used in a fluid pipe or pipe system which only permits flow of fluid at pressure drops across the valve up to a predetermined maximum value, while at pressure drops exceeding the said maximum predetermined value the valve prevents or at least restricts the flow of fluid in the pipe or pipe system including such valve or valves.

In this connection "fluid" is defined to include both liquids and gases and "pressure drop" is defined to mean the difference between the fluid pressure at the inlet end of the valve and the fluid pressure at the outlet end of the valve. Normally the outlet pressure of the valve is only slightly less than the inlet pressure, a minimum pressure drop, but if for some reason there is an extreme consumption of fluid the pressure drop increases. According to the invention such an increase of pressure drop across the valve should only be allowed up to a predetermined maximum value whereupon the valve restricts or even prevents flow of fluid therethrough.

The invention also refers to a pipe system including a fluid pressure valve of the above mentioned kind.

The improved fluid pressure valve comprises a valve housing having an axial bore in which a valve is slidably received in the axial direction thereof. The valve housing is formed with at least one by-pass channel connecting the valve inlet and the valve outlet, by-passing around the valve piston when the latter is in position to allow flow of fluid, and at least one biasing means provided which is urges the valve piston to the open position. The by-pass channel or channels and the said biassing means are so formed and arranged that the by-pass channel or channels are fully open at low pressure drops oven the valve, while at pressure drops equal to or exceeding the said predetermined maximum pressure drop the valve piston successively reduces the total flow area of the valve or blocks a successively increasing number of by-pass channels to prevent all or substantially all flow of fluid through the valve.

One main object of the invention therefore is to provide a pressure valve which will automatically reduce or prevent flow of fluid in case of rupture of the pipe or conduit containing such valve, in which case the pressure drop across the valve exceeds the above mentioned maximum pressure drop, or which will automatically reduce or prevent flow of fluid in one pipe, e.g., a hot water pipe, in case there is a higher pressure in the hot water pipe than in the cold water pipe connected to one and the same mixer-water-cock and the hot water tends to flow into the cold water pipe in a direction opposite to the normal flow direction of said cold water. The valve according to the invention may be used for any other purpose where it is deemed advantageous to prevent or reduce flow of fluid through a pipe or pipe system and in which case the pressure drop between the inlet and outlet of the valve is exceeding a predetermined maximum value.

In one embodiment of the invention the valve is formed as a two-way valve which will prevent flow of fluid in either direction, which may be advantageous, for instance, when the valve is connected in a pipe system containing several valves, where one valve preceding the rupture will prevent unnecessary leakage of water while one valve following the rupture point will prevent back-flow of water from distribution conduits, thereby likewise preventing un-necessary leakage of water and in addition facilitating the filling up of the conduits after the rupture has been repaired.

One other main object of the invention is to provide a pipe system containing one or more valves of the pressure valve type which permits flow of fluid only up to a maximum predetermined value.

Further characteristics, features and advantages of the invention will appear from a study of the following specification in which a number of various embodiments of the invention are described with reference to the accompanying drawings.

Figure 2:
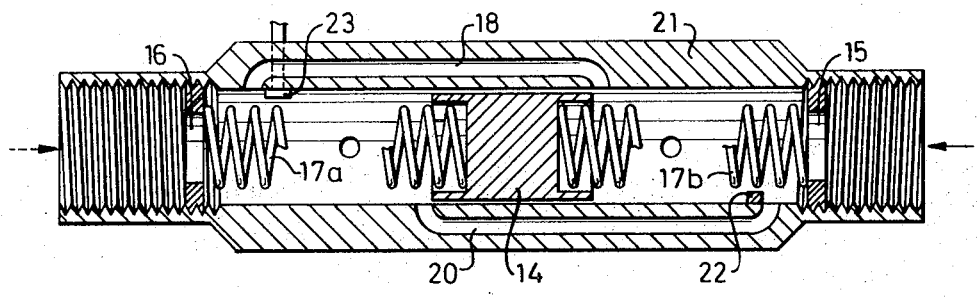
Figure 3:
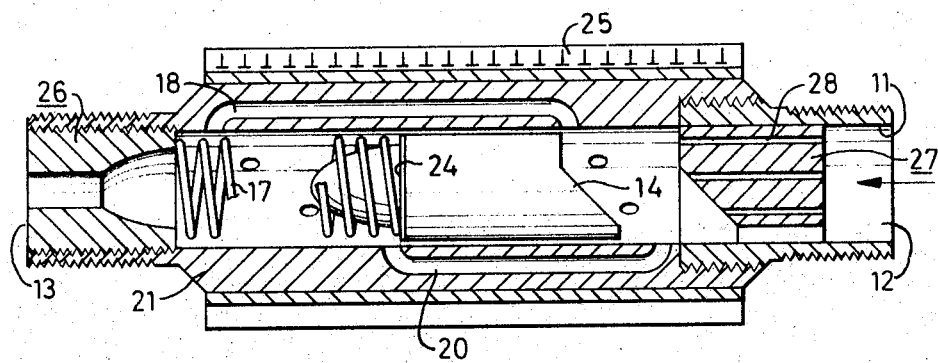
Figure 4:
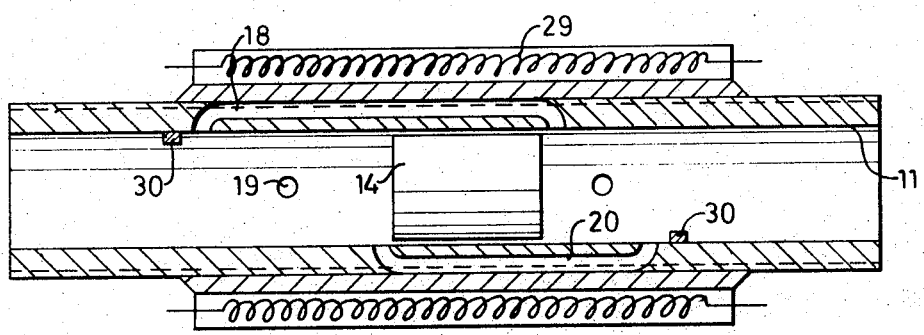
Figure 5:
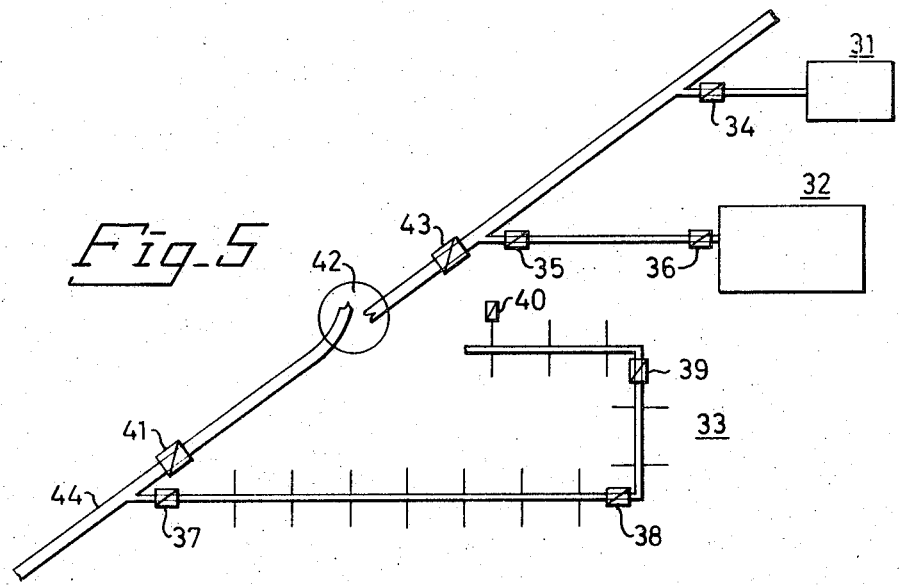
Figure 6:
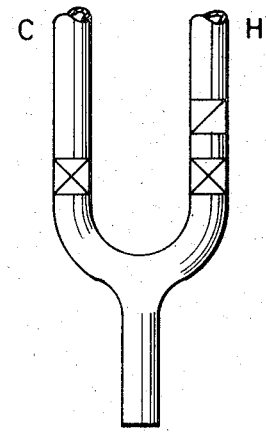

In the drawings FIG. 1 shows a simple one-way embodiment of a fluid pressure valve according to the invention, FIG. 2 shows a simple two-way valve according to the invention having means for indicating and/or restricting the movement of the valve piston within the bore of the valve housing, FIG. 3 shows a valve similar to FIG. 1 but illustrating certain modifications of the valve, FIG. 4 shows a further embodiment of the valve having electric means for biassing the valve piston in either or both directions, FIG. 5 shows diagrammatically one application of the valve according to the invention in the form of a water line system containing a number of valves, and FIG. 6 shows diagrammatically showing a mixer cock for hot and cold fluids having a fluid pressure valve according to the invention in the hot water conduit thereof.

FIGS. 1 through 4 which all shows the valves in axial cross sections are diagrammatical and only those parts which are of importance for the invention will be explained in detail. It is to be understood that various modifications and changes may be made within the scope of the appended claims.

With reference to FIG. 1 the valve according to the invention comprises a valve housing 10 of generally cylindrical configuration having an axial bore 11 therethrough. Between the inlet end 12 and the outlet end 13 a valve piston 14 is slidably received within the bore 11 in the axial direction thereof. The piston is reciprocally mounted between an inlet stop ring 15 and an outlet stop ring 16, which rings limit the axial movement of the valve piston. The stop rings 15 and 16 may be threaded or otherwise secured to the interior of the valve housing. The valve piston 14 is biassed against the inlet stop ring 15 by a compression coil spring 17 acting between the outlet stop ring 16 and the outlet end of the valve piston 14. Extending between the inlet 12 and the outlet 13 across the valve piston 14 there are a number of comparatively narrow by-pass channels, three of which, 18, 19 and 20 appear in the drawing. The by-pass channels are provided in the valve housing wall which for this purpose may have a part with extended thickness 21, and the channels open into the axial bore 11 on both sides of the valve piston 14. In the embodiment shown in FIG. 1 all by-pass channels open into the bore 11 at the same axial location on the inlet side of the inlet stop ring 15, and the channels are of different lengths. Consequently the opposite ends of the channels open into the axial bore at different distances from the inlet end openings thereof, the channel 18 having the shortest axial distances successively increasing for channels 19 and 20. At the inlet end and outlet end the valve is threaded or otherwise formed to enable the mounting of the valve in a pipe or pipe system. It may be suitable to make the outlet stop ring 16 and/or the inlet stop ring 15 displaceable in the bore, so that the location of the valve piston 14 and the spring force may be adjustable according to different purposes and different kinds of fluid.

When a pressure P, for instance a water pressure, is applied through the inlet 12 this pressure is at each moment balanced by the force of the spring 17 as adjusted according to a predetermined pressure drop across the valve. If pressure P is less than the said minimum drop pressure the valve piston is forced to the left as shown in the drawing against the action of the spring 17. As the pressure P increases, the valve piston 14 is successively moved to the left whereby it will successively block the outlet openings of channels 18, 19 and 20. When the last channel opening is blocked all flow of fluid is stopped.

In the most simple embodiment of the invention the valve is formed with one single by-pass channel in the form of an axial slot opening for the whole length in the axial bore, whereby the effective flow area of said slot is successively reduced as the piston is moved to the left in response to an increase of the pressure P until the outlet end of the slot is blocked by the valve piston in which case all flow of fluid through the valve is prevented.

The compression spring should be chosen or adjusted so that the compression of the spring at the moment when the valve piston blocks the last one of the successively blocked channels corresponds to the above mentioned maximum pressure drop over the valve allowing flow of fluid.

Even though the valve may be useful with just one by-pass channel as explained above, it is in many cases considered highly advantageous or even necessary to provide a number of successively closable by-pass channels adjacent each other located around the periphery of the valve housing. With several by-pass channels a greater effective flow area through the valve is obtained for a reasonable size of the valve, and the successive closings of the channels will give a soft action and will prevent shocks, sound and a reciprocating motor action of the valve piston within the valve housing bore.

In some cases it may be suitable to form the valve as a two-way valve which acts in both directions for the same or different pressure drops across the valve. In such a case the valve may reduce or stop the flow of fluid in the normal flow direction for instance a pipe rupture and it may at the same time or alternatively stop back flow of fluid from any pipe following said pipe rupture.

One simple embodiment of this kind of valve is shown in FIG. 2. The valve differs from the valve of FIG. 1 mainly in that the valve is mirror symmetrical about a vertical center line and in that the valve piston 14 is biassed into a central position in the valve by two springs 17a and 17b. The stop rings 15 and 16 are threaded and co-act with inner threads in the bore 11, so that the spring forces may be adjusted by adjusting the positions of said stop rings 15 and 16.

In a further embodiment of this type of valve, means are provided for preventing blocking of all by-pass channels in the back-flow direction as indicated with the dotted arrow. The said means is a shoulder 22 provided adjacent the normal pressure inlet of channel 20 which prevents the valve piston 14 from moving past said channel inlet. Adjacent the outlet of the by-pass channel 18 there is an electric contact 23 which is actuated by the valve piston 14 before the outlet of channel 18 is closed by the piston. The electric contact may be connected to an alarm system (not shown) adapted to give an alarm or otherwise indicate that the valve is about to be fully closed.

In certain applications it may be useful to have an indication of the exact position of the valve piston. Such information can be utilized as indicative of the flow amount through the valve. One embodiment of this kind is schematically shown in FIG. 3, in which the valve housing is of a non-magnetic material as is the valve piston. Adjacent the outlet end the valve piston is carries a thin magnetic ring 24. The valve housing enclosed in a sleeve containing electronic means 25 for exactly registering the position of the magnetic ring 24 and thereby the valve piston 14. The electronic means 25 is connected to a registration means (not shown) indicating in readable form the exact position of the valve piston 14.

In order to dampen the movement of the piston 14 when finally closing the valve, the outlet end of the piston may be formed with an extension coacting with a recess of corresponding form at the outlet end and/or inlet end resp. of the valve. As shown in the left part of FIG. 3 the said extension may be of parabolic form or, as shown to the right in FIG. 3, it may be of tapered or of like configuration. The outlet plug 26 and the inlet plug 27 should have about the same total flow area as the total flow area of the by-pass channels and for this purpose the plug 26 or 27 may have a number of small channels 28 each receiving a small amount of fluid.

In a combined system of guiding and biassing the valve piston or receiving information of the exact position thereof the valve housing is formed of a non-magnetic material, while the valve piston is or encloses a magnet. The valve magnet may be actuated by a series of electric coils like the coil 29 in FIG. 4. The coils may be so formed and arranged that the piston is biassed towards its intermediate position as shown in the figure, whereby the valve acts like a two-way valve as described above in connection with FIG. 2. The coils may be formed to give at the same time an indication of the exact position of the magnetic valve. To prevent the valve piston moving out of bore 11 there are two shoulders 30 in the bore 11 adjacent and outside the opposite ends of the channels 18 and 20.

It will be appreciated that the valve according to FIG. 3 and to FIG. 4 can be utilized as a flow meter in addition to its use as a pressure normalizing valve.

FIG. 5 shows a pipe system containing several fluid pressure valves according to the invention. The pipe system shows symbolically three various distribution areas 31, 32 and 33. Each distribution area is connected to a main pipe 44 and adjacent the connection point there is a fluid pressure valve of the above described kind.

If there should be a leakage or even an abnormal consumption of fluid in any of the distribution areas 31, 32 or 33 its respective valve 34, 35 or 36 automatically reduces its flow area thus assuring that the pressure drop across that valve is less than the predetermined maximum pressure drop. When thus reducing the flow of fluid through such valve the pressure is normalized and kept normal in the other distribution areas. Accordingly valve 34 controls area 31 valve 36 controls area 32, and valve 35 controls the pipe between valves 35 and 36. Likewise valves 37, 38, 39 and 40 control different parts of the distribution area 33.

If a pipe rupture occurs at 42 the valve 41 automatically stops the flow of fluid to areas 31 and 32 but not to the area 33 which is still supplied with fluid. As the fluid from areas 31 and 32 tends to flow back and out at the pipe rupture 42 valve 43 likewise automatically stops such back-flow and the only part of the pipe which must be refilled after the rupture has been repaired is the part located between the valves 41 and 43.

The fluid pressure valve of the above described kind may be used in a mixer cock like valve 40 in FIGS. 5 and 6. It may sometimes happen that the pressure of the hot water line H is greater than the pressure in the cold water line C, and if both lines are open to let out fluid of the intended temperature the higher pressure of the hot water line may undesirably cause hot water to flow up in the an opposite direction to the cold water flow.

It is apparent to those skilled in the art where and how the valves according to the invention preferably could be installed in the pipe system.

What I claim is:

1. A fluid pressure valve for a fluid line for limiting the pressure drop thereacross in at least one flow direction to a predetermined maximum value, comprising:
   a housing having an inlet, an outlet, an axial bore in the housing interconnecting the inlet and the outlet,
   a piston mounted in the bore for axial movement therein, the upstream side of the piston being subjected to inlet pressure in the inlet and the downstream side of the piston being subjected to outlet pressure in the outlet,
   biasing means for biasing the piston against the action of the inlet pressure,
   a plurality of by-pass channels extending axially within the housing to interconnect the inlet and the outlet for fluid communication therebetween and spaced apart circumferentially,
   the piston being movable to an initial position in the bore under the action of the outlet pressure and of the biasing means acting in one direction and the force of the inlet pressure in the other direction,
   said channels being so positioned axially relative to the piston that each channel is open at the inlet and the outlet for fluid communication therebetween in the said initial position of the piston, and as the piston moves from said initial position upon increasing pressure drop across the piston, a successively increasing number of said by-pass channels are closed to prevent fluid flow therethrough.

2. A fluid pressure valve according to claim 1, the upstream ends of said channels opening without obstruction into the inlet, the downstream ends of said channels being staggered in the direction of fluid flow and positioned such that all of them are normally uncovered by the piston at said initial position, the downstream ends successively being covered as the piston moves downstream as the pressure drop across the piston increases, thereby decreasing the number of channels through which fluid passes from the inlet to the outlet.

3. A fluid pressure valve according to claim 2, in which the channels are of substantially equal length and have the same cross-sectional area.

4. A fluid pressure valve according to claim 2, in which the by-pass channels are axially displaced in relation to each other at their inlet ends, and in which the piston, in its said initial position, is located intermediate the said inlet ends and the outlet ends, thereby allowing flow of fluid through all of said by-pass channels.

5. A fluid pressure valve according to claim 2, in which the channels are of increasingly greater length, the inlet ends of the channels all being located at the same axial location and the downstream ends of the channels being staggered in the flow direction.

6. A fluid pressure valve according to claim 1, including means for preventing closing of one of the by-pass channels, thereby allowing at least a small flow of fluid through the valve even at minimum pressure drop over the valve.

7. A fluid pressure valve according to claim 1, including means for indicating the position of the valve piston in at least one position thereof.

8. A fluid pressure valve according to claim 1, in which the piston, in its said initial position, is located intermediate the inlet and the outlet and in which the biasing means includes means for biasing the piston in either axial direction, depending on the direction of the pressure drop.

9. A fluid pressure valve according to claim 8, in which the biasing means is a compression coil spring acting on both sides of the piston.

10. A fluid pressure valve according to claim 8, in which the valve piston is a magnet and the biasing means includes at least one electric coil tending to keep the valve piston in an intermediate position allowing flow of fluid through all of the by-pass channels.

11. A fluid pressure valve according to claim 1, said biasing means being a compression spring acting against the downstream end of the piston.

12. A fluid pressure valve according to claim 1, said biasing means including magnetic means in which the valve piston is magnetic and the biasing means includes at least one electric coil cooperating with said magnetic piston.

13. A fluid pressure valve according to claim 1, in which the valve piston is formed with an axial extension co-acting with a corresponding recess in the end of the housing to softly dampen the axial movement of the valve piston at high pressure drops across the valve.

14. A fluid pressure valve according to claim 13, in which the axial extension and the corresponding recess are of parabolic shape.

15. A fluid pressure valve according to claim 13, in which the axial extension and its corresponding recess are tapered.

16. A fluid pressure valve according to claim 1, including means for exactly indicating the position of the valve piston, said means comprising an electric means provided along the valve and cooperating with the valve piston to provide an electric signal, the location or magnitude of which indicates the location of the valve piston.

17. A fluid pressure valve according to claim 16, in which the electric means is an electric contact provided adjacent the outlet end of at least one by-pass channel and which is actuated by the valve piston contacting the same.

18. A fluid pressure valve according to claim 16, in which the electric means is an electric sensor which is positioned to be actuated by a magnetic part of the valve piston.

19. A fluid flow system including pipes through which the fluid flows, a fluid pressure valve in at least one of said pipes, said valve being of the type which reduces or closes its flow area upon an increase in the pressure drop across the valve so as to allow a maximum predetermined pressure drop thereacross, said valve comprising:

a housing having an inlet, an outlet, an axial bore in the housing interconnecting the inlet and the outlet, a piston mounted in the bore for axial movement therein, the upstream side of the piston being subjected to inlet pressure in the inlet and the downstream side of the piston being subjected to outlet pressure in the outlet, biasing means for biasing the piston against the action of the inlet pressure, a plurality of by-pass channels extending axially within the housing to interconnect the inlet and the outlet for fluid communication therebetween, the piston being movable to an initial piston in the bore under the action of the outlet pressure and of the biasing means acting in one direction and the force of the inlet pressure in the other direction, said flow area being of a predetermined size when the piston is at said initial position, said channels being so positioned axially relative to the piston that each channel is open at the inlet and the outlet for fluid communication therebetween in the said initial position of the piston, and as the piston moves from said initial position upon the said increasing pressure drop, a successively increasing number of said by-pass channels are closed to prevent fluid flow therethrough.

* * * * *